W. P. WALTER.
APPARATUS FOR ADMINISTERING ANESTHETICS.
APPLICATION FILED APR. 3, 1915.

1,357,601.

Patented Nov. 2, 1920.
5 SHEETS—SHEET 1.

Witnesses:

Inventor
Will P. Walter

W. P. WALTER.
APPARATUS FOR ADMINISTERING ANESTHETICS.
APPLICATION FILED APR. 3, 1915.

1,357,601.

Patented Nov. 2, 1920.
5 SHEETS—SHEET 2.

W. P. WALTER.
APPARATUS FOR ADMINISTERING ANESTHETICS.
APPLICATION FILED APR. 3, 1915.

1,357,601.

Patented Nov. 2, 1920.
5 SHEETS—SHEET 4.

W. P. WALTER.
APPARATUS FOR ADMINISTERING ANESTHETICS.
APPLICATION FILED APR. 3, 1915.

1,357,601.  Patented Nov. 2, 1920.

UNITED STATES PATENT OFFICE.

WILL P. WALTER, OF CHICAGO, ILLINOIS, ASSIGNOR, BY MESNE ASSIGNMENTS, TO SAFETY ANAESTHESIA APPARATUS CONCERN, OF CHICAGO, ILLINOIS, A CORPORATION OF ILLINOIS.

APPARATUS FOR ADMINISTERING ANESTHETICS.

1,357,601.  Specification of Letters Patent.  Patented Nov. 2, 1920.

Application filed April 3, 1915. Serial No. 18,868.

*To all whom it may concern:*

Be it known that I, WILL P. WALTER, a citizen of the United States, and a resident of Chicago, in the county of Cook and State of Illinois, have invented certain new and useful Improvements in Apparatus for Administering Anesthetics; and I do hereby declare that the following is a full, clear, and exact description thereof, reference being had to the accompanying drawings, and to the letters of reference marked thereon, which form a part of this specification.

This invention relates to apparatus for administering anesthetics and analgesics and consists of the matters hereinafter described and more particularly pointed out in the appended claims.

The invention relates to an apparatus which is capable in its preferred form of use either for inducing analgesia, that is where only partial unconsciousness for short or for longer continued periods of time or where total unconsciousness for a short period of time is required, as in minor surgical operations, dental operations, obstetrical operations and particularly the last named operations wherein the condition known as "twilight sleep" is to be produced and maintained during a comparatively long interval, or for inducing anesthesia or total unconsciousness for extended periods of time by the use of ether, chloroform or the like, in the more serious surgical operations.

The invention also contemplates a modified and more simple apparatus in which the use of ether, chloroform and the like is not generally required and where the condition of analgesia only is necessary.

The object of the invention is to provide an apparatus in which the proportions of the gases or vapors comprising the analgesic or the anesthetic may be absolutely and positively determined by the operator and may be easily varied as required in the course of the administration of the analgesic or anesthetic fluid, so that the operator may have the most complete and handy control of the condition of the patient. Another object of the invention is to provide means whereby the anesthetic fluid such as ether, chloroform or the like may not only be administered under the absolute control of the operator so far as the amount administered is concerned, but also means by which the anesthetic fluid itself may be economized and used without waste.

Another object of the invention is to provide an apparatus of the kind described, which is handy and ready to be packed in a small satchel or other package that may be carried from place to place independently of the heavy gas cylinders containing the oxygen and nitrous oxid, so that the said cylinders may be delivered at the place of use independently of the improved apparatus and without any special requirements as to their size to make them capable of attachment to the apparatus.

These and other objects and advantages of the invention will appear more fully as I proceed with my specification.

My improved apparatus, in its preferred form, comprises in general:—a head or yoke piece, consisting of a frame capable of removable attachment to the valve stems of the two gas cylinders (the one containing usually nitrous oxid and the other, oxygen) with which the apparatus is to be used; of caps that support and provide top closures for tubes or vessels each containing a washing liquid through which said gases are to be passed and, when the apparatus is for use in general surgical operations, for a tube or vessel containing ether, chloroform or like anesthetic liquid; of a casing inclosing a heating chamber through which the gases and vapors are conducted to be warmed before being administered to the patient; and of the several pipes connecting the gas cylinders with the washing tubes or vessels, the washing tubes with the heating chamber, and when an ether tube or vessel is included, the pipes connecting the ether tube or vessel with the heating chamber and with the washing tubes or vessels; an adjustable standard connected to the head or yoke and providing in conjunction with the gas cylinders a stable support for the apparatus; a mouth, nose or face piece for application to the patient; and a breathing bag and valve connected to and located adjacent to the said mouth, nose or face piece and connected by a flexible tube to the aforesaid heating chamber.

The standard is made adjustable in vertical height so as to accommodate it for use with gas cylinders of different heights and it, with the cylinders, provides three supports in the manner of a tripod, for the apparatus. In case one of the gas cylinders is shorter than the other, any convenient support may be placed below the shorter cylinder to compensate for its shorter length as compared to the other cylinder, and the standard may be adjusted to the height of the longer cylinder.

Figure 14:
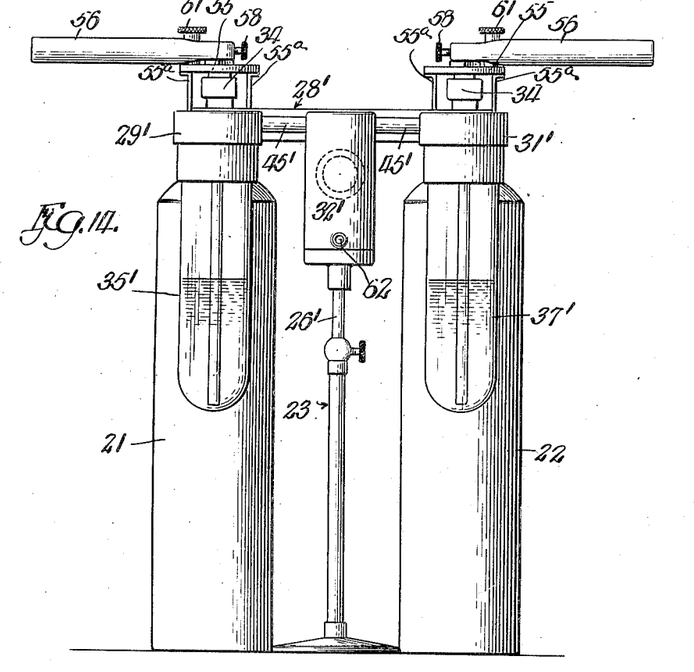
Fig. 14 is a view showing in front elevation a modified form of the apparatus and more particularly intended for use in dental and like surgery where nitrous oxid and oxygen alone are to be administered.
Figure 15:
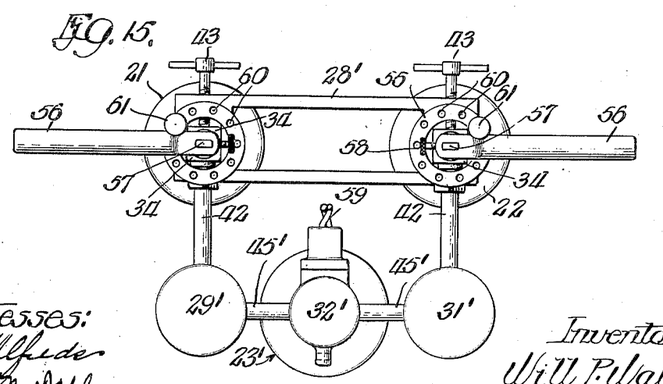
Fig. 15 is a top plan view of the apparatus shown in Fig. 14.

The head may be constructed to provide a supporting cap for an anesthetic tube for ether, chloroform or the like in addition to the caps for the two washing tubes as above stated, or it may be constructed with two caps only as shown in Figs. 14 and 15, in which no ether tube is included. The apparatus of the first kind may be used either for analgesia, as in the case of its use in dentistry, obstetrics, or in minor surgical operations, or for anesthetizing in the more serious surgical operations. The apparatus as shown in Figs. 14 and 15 in which the ether tube is eliminated, is intended more particularly for use for analgesia and where ether, chloroform or the like is not required.

Referring now to that embodiment of my invention shown in the drawings and particularly in Figs. 1 to 13 inclusive:—20 indicates as a whole the head or yoke of the apparatus; 21, 22 indicate the nitrous oxid and oxygen cylinders to the valve stems of which said head or yoke is removably attached; and 23 indicates the adjustable standard which, together with the two gas cylinders, provides the three legs for the support of the apparatus. The standard 23 has a base 24 and is made in two parts, adapted to be telescoped the one upon the other so that its vertical height may be adjusted to accommodate gas cylinders of various heights. As shown the standard comprises a tube 25 fixed to the base and a rod 26 adapted for vertical sliding movement in said tube, the two parts being arranged to be fixed in any predetermined vertical relation by means of a set screw 27.

The head 20 comprises the frame 28 (see Fig. 2), the three metallic caps, 29, 30 and 31, a casing 32 that contains the heating chamber, and the several pipe connections to be more specifically indicated later, by which the several parts mentioned are connected together to form a rigid structure.

The frame 28 (see Fig. 7) has rectangular openings 33, 33, at its ends adapted to receive the usual squared necks 34 at the tops of the gas cylinders 21, 22. Set screws 28', 28', threaded through the end bars of the frame 28 engage the necks 34 of the gas cylinders and rigidly secure the frame thereto.

The caps 29, 30 and 31 provide support and closures for the tops of glass tubes 35, 36 and 37 respectively. The tubes 35 and 37 contain a washing fluid, in this case, water, and the tube 36 contains ether. The several tubes are in the form of the familiar test tube and are detachably connected to their respective caps in any convenient manner. As shown, each tube has a threaded metal ring 38 (see Fig. 3) attached at the top and the associated cap has a threaded annular flange for engagement with said ring.

Each of the caps (29, 31) for the washing tubes has a passageway 40 extending transversely through it and opening at one end through the peripheral edge and at the other end through the bottom of the cap, preferably at the center, where it has a vertical metal tube 41 threaded into it. The metal tube 41 is closed at its lower end and extends nearly to the bottom of the glass tube in which it is contained and is provided at its lower end with a plurality of sets of diametrically arranged perforations 41a spaced at graduated equal intervals from the bottom of said tube. The purpose of these perforations will appear later.

The end of the passage 40 that opens through the edge of the cap has threaded into it a horizontal pipe 42, the other end of which is secured to the frame 28 and extends through said frame so as to project a short way into one of the rectangular openings 33 at the ends of said frame where it engages gas-tight within the vent provided in the neck 34 of the gas cylinder for escape of the gas. The said neck is held rigidly engaged with the end of the pipe 42 by means of a hand screw 43 threaded through the back of the frame 28 in line with the pipe 42 and engaged against the neck opposite the said vent. The pipes 42 thus provide rigid connection between the caps 29 and 31 and the frame 28 and also provide conduits whereby the gas from each gas cylinder is led to its associated cap whence it is discharged through the tube 41 into the washing fluid contained in the connected glass tube.

Each cap 29, 31, has a passageway 44 which opens at one end through the bottom of the cap and at its other end through the peripheral edge of the cap where it has threaded into it a pipe 45 that is connected and opens into the casing 32 which incloses the heating chamber. Shut-off valves 46 are interposed in the pipes 45.

The cap 30 of the ether tube has a diametric passageway 47 opening at its ends through the edge of the cap, and at a point intermediate its ends, (as shown at the middle), opening through the bottom of the cap where it has threaded into it a metal tube 48 which depends into the ether tube and into the body of ether contained therein. Each of the caps 29, 31, is provided with a passageway 49 opening at one end through the bottom of said cap and at the other end through the edge of the cap in line with the passageway 47 in the cap 30. The said caps and passageways are connected by pipes 50 in each of which is interposed a valve 51. The cap 30 also has a passageway 52 and a connected pipe 53 by which it, as the other two caps, is connected to the heating casing 32. Said pipe is provided with a valve 54.

In the embodiment of the invention now being described, the rod 26 that forms the upper adjustable member of the standard 23, has bifurcations 26a, 26a, which are located at either side of the ether tube 36 and are connected by U-fittings 26b, to the pipes 50, thus rigidly connecting the standard 23 to the head 20 of which said pipes form a part.

There is attached to the frame 28, in connection with each of the gas cylinders, a horizontal valve adjusting ring 55. Said valve ring is supported on suitable upright arms 55a (see Figs. 2 and 6) rising from the frame and said ring is arranged concentrically with the position to be occupied by the neck 34 of the gas cylinder. A detachable handle 56 is provided for each of the gas cylinders. Said handle has an aperture for engagement with the flat valve stem 57 which projects above the neck of said cylinder and is provided with a set screw 58 for tightening it on said valve stem. The ring 55 has a plurality of apertures 60 (in this case ten in number) which apertures are spaced at equal arcuate distances apart and arranged to receive a thumb pin 61, which rises from the plane of the ring into the path of the handle 56. Said pin acts as a stop to limit the movement of said handle and thus may be used to carefully predetermine the amount of the maximum opening of the gas cylinder valve in each case.

The casing 32 that contains the heating chamber consists of a tubular body containing a longitudinally extending bore or chamber 32a. (See Fig. 3). It is of reduced diameter throughout the greater part of its length, where it is surrounded by an electric heating coil 32b of familiar construction. Said coil is supplied by conductors 59 led to the coil through an inlet box 60a attached to the back of the casing 32. The bottom of the casing is closed by an apertured, threaded plug 61 in the open end of which is secured a metal pipe 62 which extends downwardly and forwardly toward the front of the apparatus. A flexible tube 63 is fitted to the front end of said tube and connects the same with a breathing bag 64 of a familiar type. (See Fig. 1).

There are preferably provided on each of the pipes 42 that lead from the gas cylinders, small auxiliary heating coils 65 which may be used when required to prevent freezing in the neighborhood of the valves of the gas cylinders due to the expansion of the gas as it escapes into the pipes 42 on the way to the washing tubes. Said heating coils are supplied with current through inclosed conductors 66a which are connected to the inlet box 60a and are provided with detachable plugs 67a for insertion in suitable sockets connected with the auxiliary heating coils 65. Thus said auxiliary heating coils may be used or not, as required.

The operation of the apparatus thus far described is as follows. When the apparatus is used for analgesia, as in the case of use by dentists or for minor surgical operations, the valves 51 in the pipe connections between the caps 29, 31, of the washing tubes and the cap 30 of the ether tube, are closed and the valve 54 in the pipe connection between the cap of the ether tube and the heating chamber is closed. The valve 46 in the pipe connections between the caps of the washing tubes and the heating chamber are open. The thumb pin 61 associated with the apertured valve adjusting ring 55 is placed in one or the other of the apertures in said ring, depending upon the flow of gas desired, and the crank arm 56 on the valve stems of the gas cylinders are turned until they are arrested by the said thumb pins. The tubes being filled with the washing fluid up to a point above the level of the top set of diametrically opposed apertures 41ª in the metal tubes 41 contained in the glass washing tubes:—the gas, passing through the associated pipe 42 and down through the perforated pipe 41 will escape through one or more of the sets of graduated perforations in the metal tube 41, (counting downward from the top) depending upon the opening of the valve which permits the escape of the gas from the cylinder. The escape of the gas from these apertures is visible through the transparent glass walls of the washing tubes and through the washing liquid itself and thus the operator is enabled, when using two gases, for example, oxygen from one tank and nitrous oxid from the other tank, to so adjust the valves on the gas cylinders as to mix the two gases in the desired proportions. For example, if he wishes to mix the gases in the proportion of three and four, he adjusts the valve on the one cylinder to discharge the gas through the first, second and third (counting from the top) perforations in the connected tube 41, and adjusts the valve of the other cylinder until the gas escapes through the first, second, third and fourth (counting from the top) apertures in the tube 41 connected therewith.

Thus, although the pressure in the two gas cylinders may be different, as the head against which both gases are to work is substantially the same, the proportions of the two gases which enters the warming or heating chamber contained in the casing 32, may be accurately determined by observation of the tubes 41 in the two glass washing tubes through the transparent walls of said washing tubes. Said tubes 41 thus constitute what may be called sight feed gage tubes, since by looking at them the comparative rate of feed or flow of the gases passing through them may be visually observed.

By the improved construction the operator is always enabled to determine and adjust the amount and proportion of the gases administered to the patient.

The gases escaping from their respective washing tubes pass together through and mix in the heating chamber in the casing 32 and then flow through the metal tube 62 and the flexible tube 63 to the breathing bag 64. In passing through the heating chamber, they are warmed to the desired temperature so that the mixture of gas is administered to the patient warm instead of cold.

The metal tube 48 contained in the ether tube is, as shown, an aspirator tube of familiar construction. If desired, however, a tube such as that shown in the washing tubes 35 and 37 may be used instead. The aspirator tube 48 comprises an upper member 48ª having a small passageway 48ᵇ extending downwardly therethrough and opening at a point near the bottom of said member through two angularly spaced ports 48ᶜ. (See Fig. 4.) The part 48ª is provided with an annular groove 48ᵈ in the neighborhood of these ports and with a vertically extending V-shaped groove 48ᵉ extending from the bottom of said part 48ª up to the annular groove 48ᵈ. A tubular part 48ᶠ is secured to the lower end of the part 48ª, the same embracing the reduced lower end of said part 48ª and surrounding the annular groove 48ᵈ. Said tubular part 48ᶠ has ports or openings 48ᵍ in line with the ports 48ᶜ contained in the part 48ª. The ports 48ᵍ are of slightly larger diameter than the ports 48ᶜ. The aspirator tube 48 depends into the body of the ether contained in the glass ether tube.

When gas is introduced under pressure into the passageway 47 in the cap 30 of the ether tube, it passes down through the passageway 48ᵇ and outwardly through the ports 48ᶜ and 48ᵍ. This produces a partial vacuum in the annular space provided by the annular groove 48ᵈ which causes the ether to be sucked up through the V-shaped groove 48ᵉ into the annular space provided by the groove 48ᵈ and to be then carried into the parts providing the pressure. The ether is thus atomized and carried off in this form with the gas producing the pressure through the tube 53 into the heating chamber. When the ether tube is used, the valves 46 are closed and one or both of the valves 51 are opened, depending upon whether one or both gases from the gas cylinders are to be used in connection with the administering of the ether.

At the end of the bag 64 remote from the apparatus and adjacent the mouth, nose or face piece by means of which the gas is to be administered to the patient, there is fixed a valve piece 66. (See Figs. 1, 9 and 10.) Said valve piece consists of a casing 67 containing a chamber 68; of a tubular extension 69 opening into said chamber 68 and adapted for connection to the breathing bag; and of a smaller tubular extension 70, in axial alinement with said larger tubular extension 69, adapted to receive a short flexible tube 71 for immediate connection to the mouth, nose or face piece. The casing is open at one side to receive a threaded cap 72 which is provided with a check valve. Said check valve is of familiar construction and includes an outer apertured plate 74 and a similarly apertured plate 75 rotatively mounted thereon and arranged in such manner that the casing may be brought into or out of communication with the outer air, the construction in this respect being familiar and requiring no particular description. The check valve proper consists of a disk 76 of mica which normally rests on a flange 77 fixed to the bottom of the cap 72 and which is limited in its upward movement toward the top of the cap by means of cross bars 78.

When the patient is intended to breathe directly out of and into the breathing bag, the outer plate 75 is adjusted so as to close the openings in the plate 74. In this case, at the exhalation and at the inhalation, the patient will inhale from the bag and will exhale back into the bag. When, however, the plate 75 is adjusted so that the openings in the plate 74 are connected with the outer air, when the patient inhales, the outer air will hold the check valve closed so that he will draw in the gas from the breathing bag. When he exhales, the pressure produced in the chamber 68 by the pressure of the exhalation and by the backed up pressure of the gas coming from the breathing bag will act to lift the check valve 76 and the breath exhaled will escape through the openings in the plates 74, 75 to the outer air.

Any kind of an inhaling member, that is to say, a mouth piece, a face piece, or a nose piece, may be used in connection with my improved apparatus. For example, in Fig. 1, the valve casing is shown connected directly to a mouth piece 80, which is gripped between the teeth of the patient. In such case the valve casing may be provided with suitable straps 81 for supporting it in position.

Figure 11:
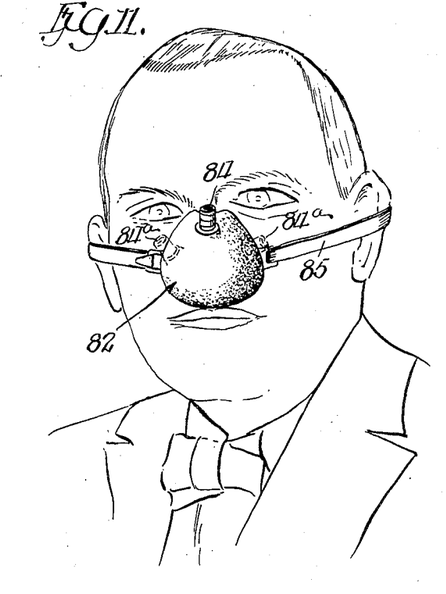
Figs. 11 and 12 are views indicating respectively a nose mask and a mouth mask as applied to the patient and adapted to be used with my improved apparatus.
Figure 12:
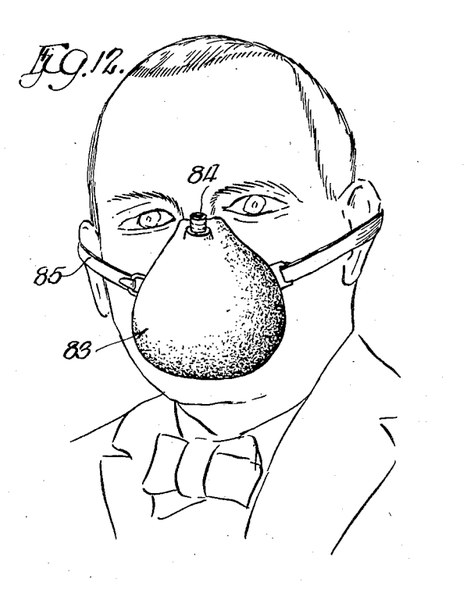

In Fig. 11 is shown a nose piece 82 of familiar construction and in Fig. 12 a face piece covering both the mouth and nose, 83. These are each provided with suitable nipples 84 for the attachment of the flexible tube 63 on the valve casing and these nipples may be provided in any suitable position, for example, either in that shown in full lines in Fig. 11, or in that shown in dotted lines 84ª in said figure so that they will be out of the road of the particular operation that is to be carried on. The nose or face piece is attached to the head of the patient by means of straps 85 in a familiar manner.

It will be apparent that in the construction described, the breathing bag with its valve is located adjacent the face of the patient and in close proximity to the inhaling and exhaling organ, namely, the mouth, the nose, or both, so that the patient can inhale directly from and exhale directly into said breathing bag. Thus the full benefit of the breathing bag is secured, which is not true when the breathing bag is located at a distance from the administering member of the anesthetic or analgesic fluid. In addition, this location prevents any possibility of a kinking or bending in the flexible tube which is necessary to connect the bag with the mouth, nose or face piece, which kinking or bending would tend to stop the flow of gas and thus prevent or interrupt the administering of the fluid without the operator's immediate cognizance of what had taken place.

In Figs. 14 and 15 are shown a modification of the apparatus in which the ether tube 36 is omitted and which is intended for minor surgical or other operations where analgesia alone is required. In this case the casing containing the heating chamber 32ª is located between and in the vertical plane of the washing tubes 35', 37', the caps 29', 31' of said tubes being connected by pipes 45' to said heating casing. The frame 28' is connected to the gas cylinders as before, like parts being indicated by the same numerals as heretofore used. The standard 23 is in this case made adjustable as before, but instead of being bifurcated, the vertical adjusting rod 26' is simply attached to the bottom of the heating casing 32. No valves are included in the pipes connecting the gas cylinders, caps and heating casing of the head in this case.

Figure 1:
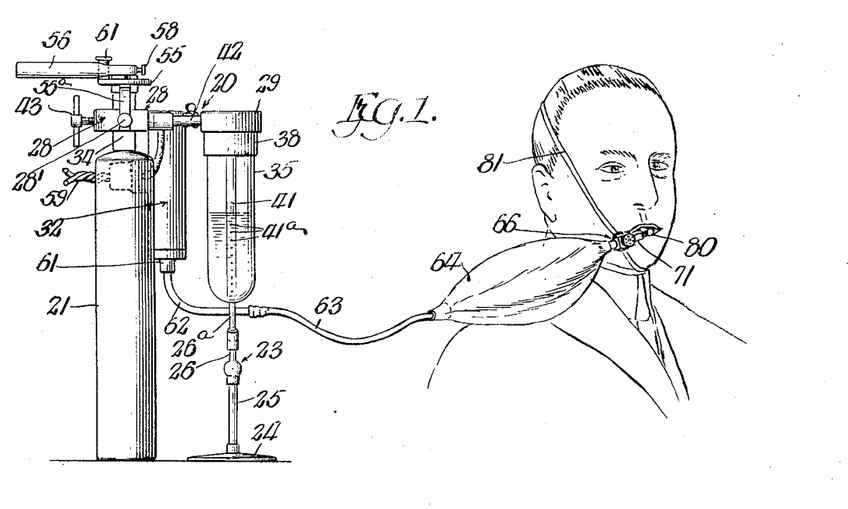
Figure 1 is a view representing my improved apparatus in side elevation and showing it connected by a mouthpiece to the patient.
Figure 2:
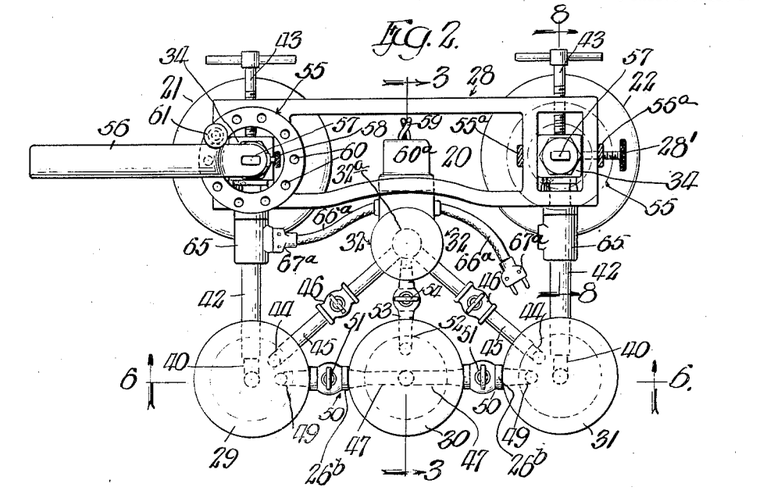
Fig. 2 is a top plan view of the apparatus in its preferred form.
Figure 3:
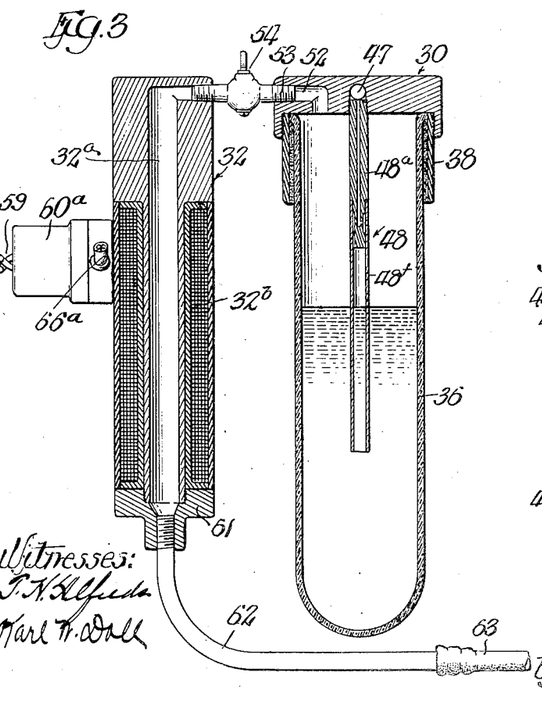
Fig. 3 is a view representing on an enlarged scale a vertical section through Fig. 2 in the plane indicated by the line 3—3 thereof.
Figures 4, 5:
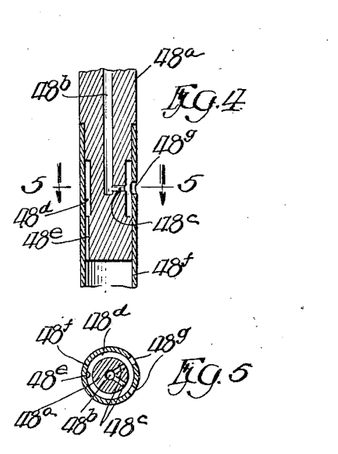
Fig. 4 is a partial vertical section on a still further enlarged scale of the aspirator tube shown in Fig. 3.
Fig. 5 is a transverse section through said tube in a plane indicated by the line 5—5 of Fig. 4.
Figure 6:
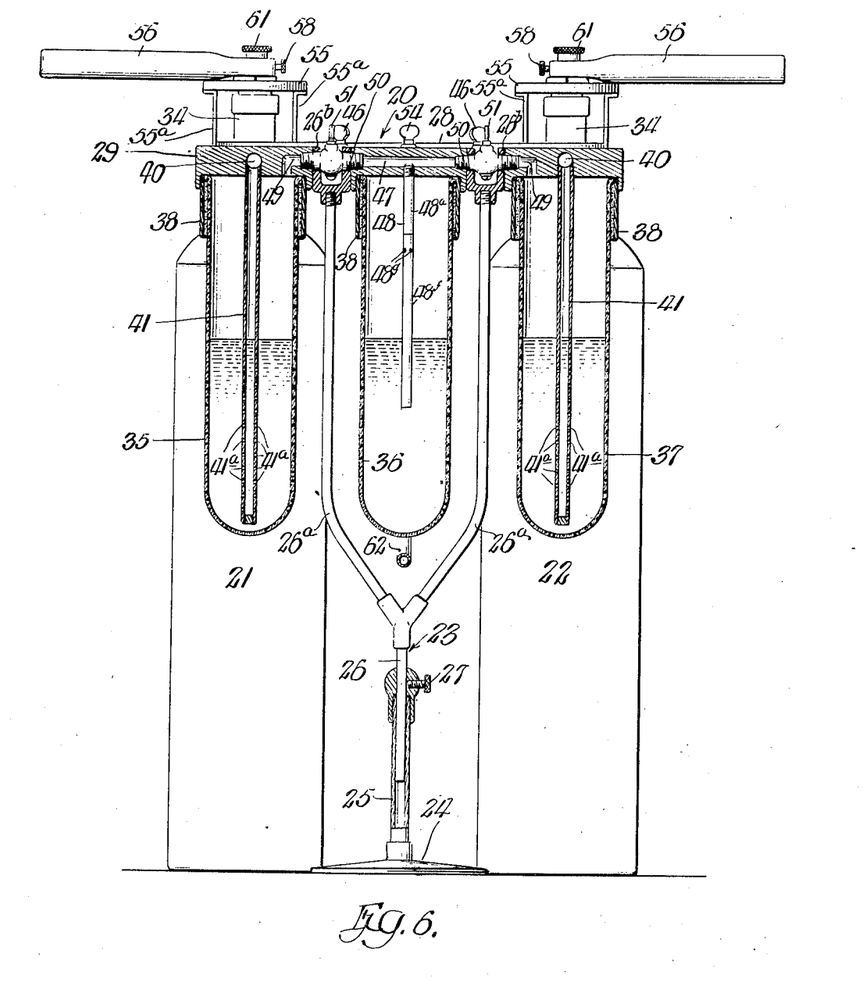
Fig. 6 is a view representing a vertical section through Fig. 2 in a plane indicated by the line 6—6 of Fig. 2.
Figure 7:
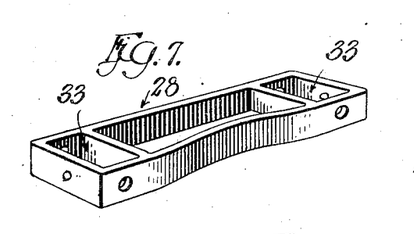
Fig. 7 is a detail perspective view of the supporting frame for the various parts of the apparatus.
Figure 8:
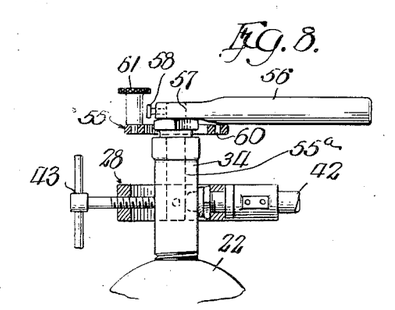
Fig. 8 is a view representing a vertical section through Fig. 2 in a plane indicated by the line 8—8 of Fig. 2.
Figure 9:
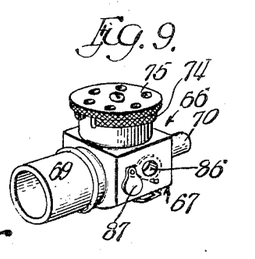
Fig. 9 is a perspective view of the breathing bag valve.
Figure 10:
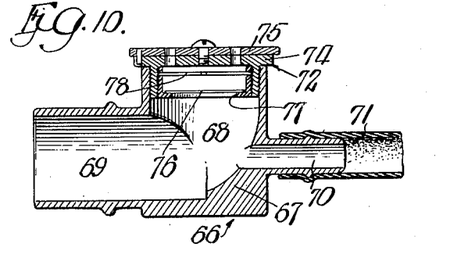
Fig. 10 is a view representing on an enlarged scale a longitudinal section through the breathing bag valve.
Figure 13:
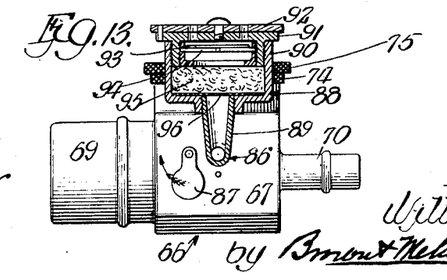
Fig. 13 is a view representing a side elevation of the breathing bag valve with an ether cap (shown in section).

In case of the use of the apparatus such as that illustrated in Figs. 14 and 15, the valve piece for the breathing bag is preferably made as illustrated in Figs. 9 and 13, so that an ether cup may be attached to it.

In the side wall of the valve casing as illustrated in Fig. 9 is provided an aperture 86 which may be normally closed by a shutter 87. This aperture 86 when the shutter 87 is open, may be used to attach an ether cup as shown at 88 in Fig. 13. The ether cup 88 consists of an angular tube 89 adapted to be engaged at one end in the aperture 86 in the wall of the casing and secured at its upper end to the bottom of a cup 90. Said cup is closed by apertured plates 91, 92 substantially such as described in connection with the closure of the top of the valve casing chamber and there is provided in the cup below said apertures, a check valve 93 which, however, works in an opposite direction to that described in the case of the check valve 76. Said check valve normally rests upon cross bars 94 placed below the apertures in the plates 91, 92, and upon pressure upwardly through said cup, the check valve closes against the apertures and prevents a flow from the cup. The patient, however, may inhale and draw air freely from the outside through the apertures in the plates 91, 92 into and through the cup and into the valve casing.

In the bottom of the cup is placed cotton or other fibrous material saturated with the ether, said cotton 95 resting upon wire gauze 96 placed in the bottom of the cup. Thus as the air is drawn through the cup it passes through the ether saturated cotton and becomes impregnated with ether vapor which is inhaled by the patient.

When the ether cup is used the apertures in the plates 74, 75, associated with the main check valve of the valve piece, are closed. This construction provides a convenient means for administering ether with the simplified form of the apparatus shown in Figs. 14 and 15.

The operation and the convenience of my apparatus in the administering of anesthetics or analgesics to patients either through the nose, through the mouth, or through the mouth and nose together, will be apparent to those familiar with the subject, from the foregoing description. The sight feed gage provided in the apparatus is of particular importance as it enables the operator to absolutely control the proportion of the two gases administered, no matter what may be the pressure or the relative pressures in the two cylinders from which the gases are taken.

In the preferred form of the apparatus, including the ether tube, the desired proportion of nitrous oxid and oxygen may be administered alone until the patient begins to lose consciousness and then ether may be added and the patient put in condition for more serious surgical operations by the simple manipulation of the valves in the head of the apparatus. The location of the breathing bag near the face, nose or mouth piece enables the patient to breathe directly into the bag so as to get the full benefit of its use and there is no danger of any obstruction or stoppage in the connecting tube to prevent the full benefit of the breathing bag being realized.

The detachable feature of the head, together with the adjustable standard makes it possible to use the apparatus with gas cylinders of any size, while at the same time a proper support is provided for the parts carried by the head.

The embodiment of the invention illustrated which includes the closed tube containing the ether, chloroform or like anesthetic liquid, with the aspirator tube depending into the body of the anesthetic liquid and with its ports above the level of said liquid, together with the means for admitting and regulating the flow of gas under pressure through said aspirator tube, economizes the use of the anesthetic liquid and prevents waste of the same, and in addition enables the operator to absolutely control the amount of the anesthetic administered to the patient.

The action of the aspirator is to impregnate or saturate the gas (oxygen or mixture of oxygen and nitrous oxid, or air, where air alone is used) discharged from the anesthetic tube with the volatilized anesthetic, thus producing what may be called an etheretted or anesthetted gas.

While in describing my invention I have referred to certain details of mechanical construction and arrangement, it is to be understood that the invention is to be in no way limited thereby except as may be pointed out in the appended claims.

I claim as my invention:—

1. In an apparatus of the kind described, in combination with a gas cylinder, a closed vessel having a transparent wall and containing a transparent liquid, a sight feed gage tube contained within said vessel, said sight feed gage tube being provided with a plurality of openings spaced at vertically graduated distances below the level of said liquid, means providing an escape for gas from said vessel, means connecting said gas cylinder with said sight feed gage tube, and valve means for controlling the flow of gas from said cylinder to said sight feed gage tube.

2. In an apparatus of the kind described, in combination with a gas cylinder, a closed vessel having a transparent wall and containing a transparent washing liquid, a sight feed gage tube depending into said vessel, said sight feed gage tube being closed at the bottom and being provided with a plurality of openings spaced at vertically graduated distances below the level of the liquid in said vessel, means providing for the escape of gas from said vessel, means connecting said gas cylinder with said sight feed gage tube, and valve means for controlling the flow of gas from said cylinder to said sight feed gage tube.

3. In an apparatus of the kind described, in combination with a plurality of gas cylinders, a plurality of transparent tubes, one for each gas cylinder, each tube being open at the top and containing a transparent washing liquid, a cap inclosing said transparent tube, a sight feed gage tube depending from said cap into said transparent tube, said sight feed gage tube being provided with a plurality of openings spaced at vertically graduated distances below the level of the liquid in said transparent tube, means providing inlet and outlet conduits in said cap, the inlet conduit connecting said sight feed gage tube with the associated gas cylinder, and valve means for controlling the flow of gas from each cylinder to the sight feed gage tube of the associated transparent tube.

4. A sight feed gage device to determine the flow of a gas, comprising a transparent tube containing a transparent liquid, a cap closing the top end of said tube, said cap being provided with an inlet passageway and with an outlet passageway, a sight feed gage tube connected with said inlet passageway and depending into the liquid in said transparent tube, said sight feed gage tube being provided with a plurality of openings spaced at vertically graduated distances below the level of the liquid in said tube, and means for admitting gas to said inlet passageway including a controlling valve.

5. In an apparatus of the kind described, in combination with a plurality of gas cylinders and the valves controlling the escape of gas from said cylinders, a head capable of detachable connection with the necks of said cylinders, an adjustable standard connected with said head and adapted in conjunction with said cylinders to provide a support for said head, a plurality of transparent tubes containing washing liquid, there being one tube for each cylinder, a plurality of caps, one for each transparent tube, detachably connected therewith, a heating chamber and a discharge tube leading from said heating chamber, means providing conduit connections between each of said caps and said heating chamber, and pipes connected with said caps and adapted for detachable connection with the necks of said gas cylinders, and sight feed gage tubes depending from said caps into said transparent tubes and connected with the pipes leading from said gas cylinders, each sight feed gage tube being provided with a plurality of openings spaced at vertically graduated distances below the level of the liquid in said transparent tubes.

6. In an apparatus of the kind described in combination with a plurality of gas cylinders, a head adapted for detachable connection with the necks of said gas cylinders, said head including a warming chamber, a plurality of caps, conduit connections between said caps and said warming chamber and between said caps and said gas cylinders, transparent tubes open at the top and detachably connected with said caps, each of said tubes containing liquid, and sight feed gage tubes depending from said caps below the level of the liquid in said tubes, said sight feed gage tubes being provided with a plurality of openings spaced at graduated distances below the level of the liquid in said tubes.

7. In an apparatus of the kind described, in combination with gas cylinders, a head adapted for detachable connection with said gas cylinders, an adjustable standard connected to said head, a warming chamber rigidly connected to said head, washing tubes connected with said head and with said gas cylinders, conduits whereby the gas from said washing tubes is conducted to said warming chamber, a conduit leading from said warming chamber and including a flexible tube, a breathing bag remote from said head connected to said flexible tube, a valve piece connected to the end of said breathing bag at its far end, and means for detachably connecting said valve piece directly to the inhaling member of said apparatus.

8. In an apparatus of the kind described, in combination with a breathing bag and an inhaling member, a valve piece intermediate said breathing bag and said inhaling member, said valve piece comprising a casing provided at one end with a tubular extension connected to said breathing bag and at the other end with another smaller tubular extension in line with the first named tubular extension and connected to the inhaling member, said casing being open at the top, a cap closing the top of said casing and a main valve to control the escape of air from said casing, and an upwardly opening check valve adapted to permit escape of gas from and prevent the entrance of air into said casing when the main valve is open.

9. In an apparatus of the kind described, in combination with the gas cylinders, a head adapted for detachable operative connection with said cylinders, and including a heating chamber, and conduits connecting said cylinders with said heating chamber, a discharge conduit leading from said heating chamber and including a flexible tube, a breathing bag located remote from said head and connected to said flexible tube, and a valve piece connected to the far end of said breathing bag and adapted for direct detachable connection to an inhaling member.

10. In an apparatus of the kind described, in combination with the gas cylinders, a head adapted for detachable operative connection with said cylinders, and including a heating chamber and conduits connecting said cylinders with said heating chamber, a discharge conduit leading from said heating chamber and including a flexible tube, a standard adjustable in vertical height attached to said head, a breathing bag located remote from said head and connected to said flexible tube, and a valve piece connected to the far end of said breathing bag and adapted for direct detachable connection to an inhaling member.

11. In an apparatus of the kind described, in combination with the gas cylinders, a head adapted for detachable operative connection with said cylinders and including a heating chamber, washing tubes, and conduits connecting said cylinders through said washing tubes with said heating chamber, a discharge conduit leading from said heating chamber and including a flexible tube, a breathing bag located remote from said head and connected to the flexible tube of said discharge conduit, and a valve piece connected to the far end of said breathing bag and adapted for direct detachable connection to an inhaling member.

12. In an apparatus of the kind described, in combination with the gas cylinders, a head adapted for detachable operative connection with said cylinders, and including a heating chamber, washing tubes, an ether tube, conduits connecting said cylinders through said washing tubes, and ether tube with said heating chamber and shut-off valves in said conduits, a discharge conduit leading from said heating chamber and including a flexible tube, a breathing bag located remote from said head and connected to the said flexible tube, and a valve piece connected to the far end of said breathing bag and adapted for detachable connection to an inhaling member.

13. In an apparatus of the kind described, in combination with the gas cylinders, a head adapted for detachable operative connection with said cylinders and including a heating chamber, washing tubes, and conduits connecting said cylinders through said washing tubes with said heating chamber, a discharge conduit leading from said heating chamber and including a flexible tube, a standard adjustable in vertical height attached to said head, a breathing bag located remote from said head and connected to the flexible tube of said discharge conduit, and a valve piece connected to the far end of said breathing bag and adapted for direct detachable connection to an inhaling member.

14. In an apparatus of the kind described, in combination with the gas cylinders, a head adapted for detachable operative connection with said cylinders, and including a heating chamber, washing tubes, an ether tube, conduits connecting said cylinders through said washing tubes, and ether tube with said heating chamber and shut-off valves in said conduits, a discharge conduit leading from said heating chamber and including a flexible tube, a standard adjustable in vertical height attached to said head, a breathing bag located remote from said head and connected to the said flexible tube, and a valve piece connected to the far end of said breathing bag and adapted for detachable connection to an inhaling member.

15. In an apparatus of the kind described, in combination with a gas cylinder, a valve device for controlling the flow of gas therefrom, a vessel having a transparent wall and containing a washing liquid, and a gage device observant through said transparent wall and being connected to said valve device, said gage device being constructed to act through the medium of the washing liquid to produce visual indicia at varying heights in said washing liquid in proportion to the rate of flow from said valve device.

16. In an apparatus of the kind described, a gas cylinder, a closed vessel having a transparent wall and containing a liquid at a pre-determined level, means providing for the escape of gas from said cylinder, a sight feed gage tube within said vessel containing a liquid normally at the level of the liquid in said vessel, means connecting said gas cylinder with said sight feed gage tube, and a valve device for controlling the flow of gas to said sight feed gage tube, said sight feed gage tube being constructed to discharge so as to act through the medium of said liquid to produce visual indicia at varying heights in said liquid in proportion to the rate of flow from said valve device.

17. A sight feed gage device to determine the rate of flow of gas, comprising a closed vessel having a transparent wall and containing a liquid, a sight feed gage tube depending into the liquid in said vessel, said tube being constructed to discharge gas into said vessel below the level of the liquid therein, means providing an inlet passage for gas into said sight feed gage tube, said vessel being provided with an outlet above the level of the liquid therein, and a controlling valve connected to said inlet passage, said sight feed gage tube being constructed to discharge so as to act through the medium of said liquid to produce visual indicia at varying heights in said liquid, in proportion to the rate of flow from said valve.

18. In an anesthetizing apparatus, the combination with means for applying a gaseous reagent, of a transparent liquid-container, a tube extending vertically below the liquid-level thereof, and connected with the gas supply; said tube being perforated vertically at intervals along its side, and means for regulating the flow of gas through the perforations in said tube.

19. In a device of the class described, the combination with a liquid-containing chamber having transparent walls, an inlet tube extending therein below the liquid-level normally maintained in said chamber and having spaced perforations vertically submerged at different levels, and an outlet member positioned above the normal liquid-level.

20. In apparatus of the class described, the combination with a plurality of containers of gas under pressure, means for individually controlling the flow of gas from said containers and sight feed mechanism therefor, comprising a plurality of substantially vertical tubes perforated at intervals along their lengths, a liquid sealing medium for said tubes and transparent containing means for permitting the concurrent view of said perforated tubes during the flow of gas therethrough, substantially as set forth.

21. In apparatus of the class described, the combination with a plurality of containers of gas under pressure, of valve mechanism for controlling individually the flow therefrom, a plurality of sight-feed gage tubes connected each to each with said containers and positioned so as to be jointly visible, and a liquid medium so associated with said tubes as to produce visual indicia of the respective flow of gases through each of said sight-feed gage tubes, substantially as set forth.

In testimony that I claim the foregoing as my invention I affix my signature in the presence of two witnesses, this 29th day of March, A. D. 1915.

WILL P. WALTER.

Witnesses:
T. H. ALFREDS,
KARL W. DOLL.